United States Patent [19]
Epp et al.

[11] Patent Number: 5,882,137
[45] Date of Patent: Mar. 16, 1999

[54] PROCESS FOR PREPARING A LOW-FRICTION BALL JOINT, AS WELL AS LOW-FRICTION BALL JOINT

[75] Inventors: Karl-Heinz Epp, Stemwede-Wehdem; Gerhard Ey, Stemwede-Drohne; Klaus Bröker, Wallenhorst; Martin Wellerding, Damme, all of Germany

[73] Assignee: Lemförder Metallwaren AG, Stemwede-Dielingen, Germany

[21] Appl. No.: 876,387

[22] Filed: Jun. 17, 1997

[30] Foreign Application Priority Data

Jun. 25, 1996 [DE] Germany .......................... 196 25 351.9

[51] Int. Cl.⁶ ..................................................... F16C 11/06
[52] U.S. Cl. ........................... 403/135; 403/122; 403/137; 403/140
[58] Field of Search ..................................... 403/135, 122, 403/132, 140, 137, 133, 139, 77, 320, 343, 141, 143, 56; 411/309; 29/898.043, 898.047, 898.048, 898.052

[56] References Cited

U.S. PATENT DOCUMENTS

| | | |
|---|---|---|
| 1,639,692 | 8/1927 | Gauthier .................................. 403/135 |
| 1,693,840 | 12/1928 | Faudi ....................................... 403/137 |
| 3,539,210 | 11/1970 | Wehner et al. .......................... 403/132 |
| 3,882,917 | 5/1975 | Orlomoski .............................. 411/309 |
| 3,891,336 | 6/1975 | Herbenar ................................. 403/320 |
| 4,120,597 | 10/1978 | Millard ................................ 403/320 X |
| 4,613,251 | 9/1986 | Bellamy et al. .................... 403/135 X |
| 5,395,176 | 3/1995 | Zivkovic ............................. 403/135 X |

FOREIGN PATENT DOCUMENTS

| | | | |
|---|---|---|---|
| 1133383 | 11/1956 | France .................................... 403/135 |
| 73181 | 3/1948 | Norway .................................. 403/137 |
| 194044 | 1/1965 | Sweden .................................. 403/140 |
| 852139 | 10/1960 | United Kingdom ................... 403/140 |
| 2 004 321 | 3/1979 | United Kingdom . |

*Primary Examiner*—Harry C. Kim
*Attorney, Agent, or Firm*—McGlew and Tuttle

[57] ABSTRACT

A process for preparing a low-friction ball joint and a ball joint prepared according to this process are presented, wherein a ball pivot with a joint ball made integrally in one piece with it is fitted into an insert ring via the intermediary of a bearing shell, which is cylindrical on the outside at least in some areas, the insert ring is subsequently screwed with its external thread into the internal thread of a housing in a self-locking manner, and the insert ring is then additionally tightened in the housing.

18 Claims, 2 Drawing Sheets

PROCESS FOR PREPARING A LOW-FRICTION BALL JOINT, AS WELL AS LOW-FRICTION BALL JOINT

FIELD OF THE INVENTION

The present invention pertains to a process for preparing a low-friction ball joint and to a ball joint prepared according to this process.

BACKGROUND OF THE INVENTION

An axial ball joint, which is used to connect a toothed rack to a tie rod of a motor vehicle, has been known from GB 2 004 321 A. This joint has a tubular housing, which is provided on one side with an internal thread. On the other side, located opposite the internal thread, a bearing surface, in which the joint ball made integrally in one piece with a ball pivot can be mounted, is made in the housing. The ball pivot passes through the housing with its pivot. A bearing shell, which is pretensioned against the joint ball by a disk screwed into the internal thread, is provided as a counterpiece for this housing mount on the side on which the toothed rack is connected. The tubular housing must be screwed onto the external thread of the toothed rack. An additional locking is necessary for securing against the spontaneous loosening of this connection. This is done by staking according to GB 2 004 321 A.

The solution presented in that document has the drawback that both the joint ball and the housing must be hardened if the joint ball of the ball pivot is mounted directly in the tubular housing.

However, such a solution also implies the possibility that the disk may move within the range of the thread tolerances in the radial direction.

The operation of fixing of the disk, which is additionally necessary, may cause, on the one hand, an unintended change in the pretension once set; on the other hand, a spontaneous loosening of such a connection can never be ruled out. This means increased safety risk.

SUMMARY AND OBJECTS OF THE INVENTION

The primary object of the present invention is to provide a process for preparing a low-friction ball joint which makes possible the fine adjustment of the mounting characteristics of a ball joint manufactured according to this process and is, moreover, simple and inexpensive, and to provide a low-friction ball joint manufactured according to this process.

According to the invention, a process for preparing a low-friction ball joint and a ball joint prepared according to this process are provided. The ball pivot with a joint ball made integrally in one piece with it is fitted into an insert ring via the intermediary of a bearing shell. The insert ring is subsequently screwed with its external thread into the internal thread of a housing in a self-locking manner. The insert ring is then additionally tightened in the housing.

A low-friction ball joint according to the present invention comprises a ball pivot, which has, in the known manner, a pivot area and a joint ball made integrally in one piece with it. This ball pivot is mounted in a bearing shell made of a material having limited elasticity. Two-part bearing shells are advantageous, in particular. The bearing shell may have a cylindrical jacket surface on the outside. Other geometries of the bearing shell are possible as well. Thus, it is very advantageous to impart a conical outer contour to the bearing shell, or to make same spherical.

At any rate, the spherical inner surface is adapted to the contour of the joint ball of the ball pivot. The bearing shell lies with its outer jacket surface in an insert ring in a positive-locking manner. This insert ring has, at least in some areas, an inner jacket adapted to the outer contour of the bearing shell. The insert ring should preferably secure the bearing shell against spontaneous axial movements. To achieve this, a radial collar directed toward the inside of the joint is made according to the present invention integrally in one piece with the insert ring, against which the bearing shell is supported.

The insert ring may also have a support for a sealing element, e.g., a sealing bellows arranged on the outside, or a packing ring inserted between the insert ring and the housing.

The insert ring is provided with an external thread, which is screwed into a corresponding internal thread in the housing of the ball joint. Different thread pitches and thread types are possible for this. The thread may be prepared in the housing by machining or without cutting.

It is advantageous to use a metric fine thread, because the axial depth to which the insert ring is threaded in can thus be set very accurately. Self-locking of the thread is always present according to the present invention. This may consist of introducing an adhesive into the turns of the thread at the time of the assembly of the joint, or of using an offset thread. A self-cutting thread is simple and inexpensive. Other possibilities of securing are conceivable and are within the scope of the object of the present invention. Furthermore, a radially outwardly directed, preferably circular collar, which is additionally used to tighten the insert ring in the ball joint housing, is provided on the outer circumference of the insert ring.

Such a ball joint is prepared by inserting the ball pivot with its joint ball, made integrally in one piece with it, into the insert ring, via the intermediary of the bearing shell, and by subsequently screwing the said insert ring with its external thread into the internal thread of the housing in a self-locking manner. Due to the positive locking between the insert ring and the bearing shell, the two are in sliding contact, and the bearing shell is thus pressed very uniformly against the joint ball of the ball pivot during the screwing-in process. The pressing increases with increasing depth of screwing in of the insert ring, so that the mobility of the ball pivot noticeably decreases as the insert ring penetrates into the ring more deeply.

The coefficients of friction occurring between the bearing shell and the joint ball in the ball joint are continuously determined during the screwing in. One possibility for this measurement is to measure the torque that must be applied to deflect the ball pivot. Measuring the torque that is needed to rotate the ball pivot around its central axis may be considered to be another possibility. The coefficient of friction can thus be set very accurately independently from the manufacturing tolerances of the components of the ball joint. The desired setting is preserved due to the self-locking of the thread.

For safety's sake, the insert ring is then additionally tightened in the housing. The additional tightening is performed, e.g., by rolling on or by beading in some areas the edge of the housing. A radially outwardly directed, circular collar is to be provided on the insert ring for this purpose. It should be borne in mind in this connection that the collar shall not come into contact with the housing in the axial direction, but a free space shall remain there. This is necessary to avoid stresses in the material of the insert ring, which could lead to a distortion of the coefficients of friction once set.

A groove for receiving a sealing bellows may also be provided on the insert ring above the outer collar. Other seals are possible or may be additionally used. For example, a packing ring, preferably one made of rubber, which is compressed in the axial direction due to the tightening of the insert ring in the housing and thus assumes its sealing function, may be inserted between the housing and the insert ring.

Such a ball joint makes it possible to use a great variety of different bearing materials for the bearing shell. Heat treatment is not necessary. The ball joint has no clearance and low friction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
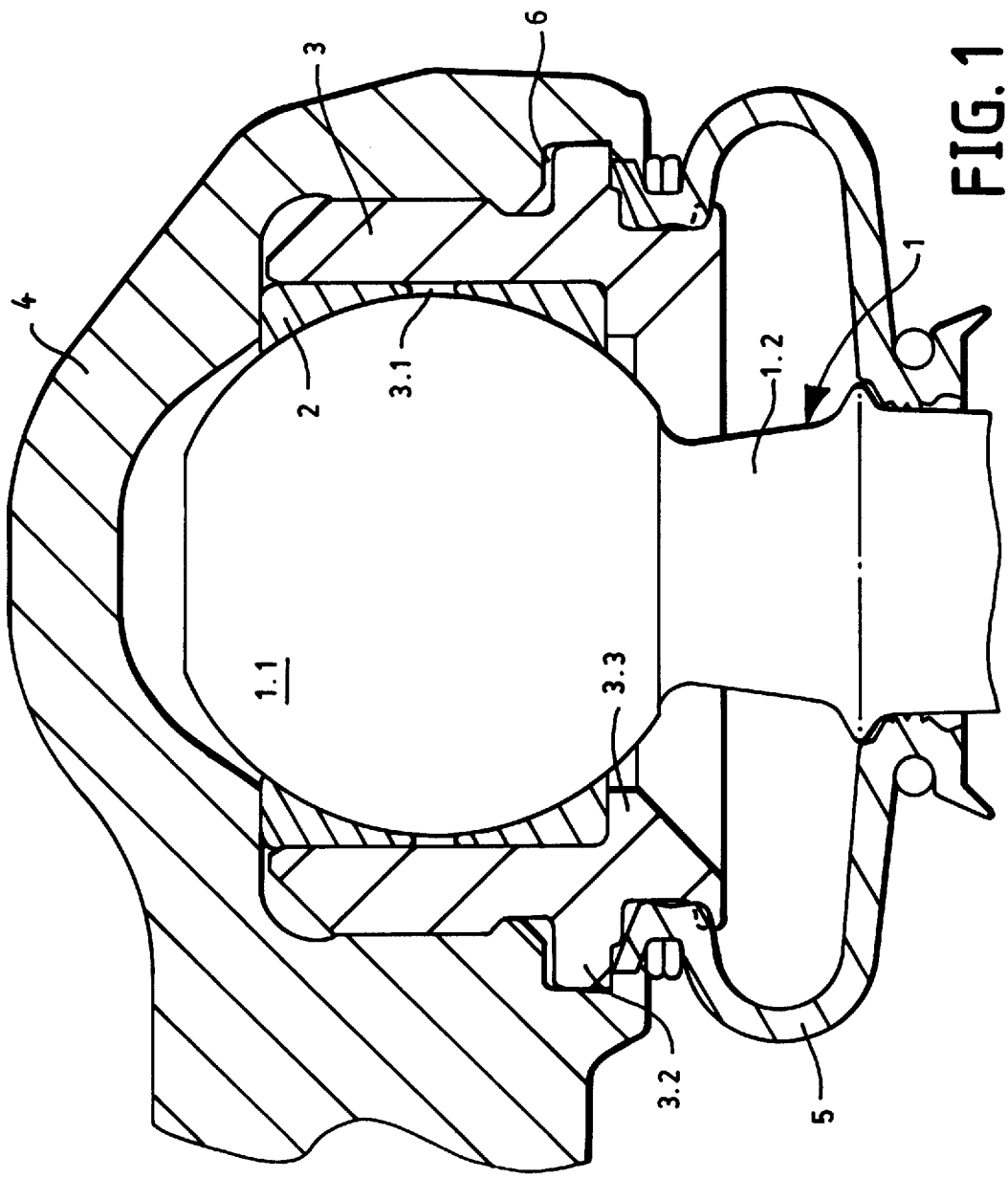
FIG. 1 is a sectional view of a ball joint according to the present invention.

Referring to the drawings, FIG. 1 shows, in a sectional view, a preferred variant of a ball joint according to the present invention.

Such a low-friction ball joint comprises a ball pivot 1, which has, in the known manner, a pivot area 1.2 and a joint ball 1.1 made integrally in one piece with it. This ball pivot 1 is mounted in a bearing shell 2 made of a material having limited elasticity. As is shown in FIG. 1, a two-part bearing shell was used in this embodiment. Both parts of the bearing shell are axially movable in relation to one another. The spherical inner surface is adapted to the contour of the joint ball 1.1 of the ball pivot 1. The bearing shell has a cylindrical jacket surface on the outside. With this bearing shell jacket surface, the ball pivot 1 is located in an insert ring 3 in a positive-locking manner. This insert ring 3 has, at least in some areas, a cylindrical inner jacket 3.1. The insert ring 3 should preferably secure the bearing shell 2 against spontaneous axial movements. According to the present invention, a radial collar 3.3, directed toward the inside of the joint, is made for this purpose integrally in one piece with the insert ring 3, against which the bearing shell 2 is supported. The insert ring 3 also has a support for a sealing bellows 5 and is provided with an external thread, which is screwed into a corresponding internal thread in the housing 4 of the ball joint. Self-locking of the thread, which comprises adhesive introduced into the turns of the thread in this case, is present according to the present invention. Furthermore, a radially outwardly directed, preferably circular collar 3.2, which is additionally used to tighten the insert ring in the ball joint housing 4, is present on the outer circumference of the insert ring.

Figure 2:
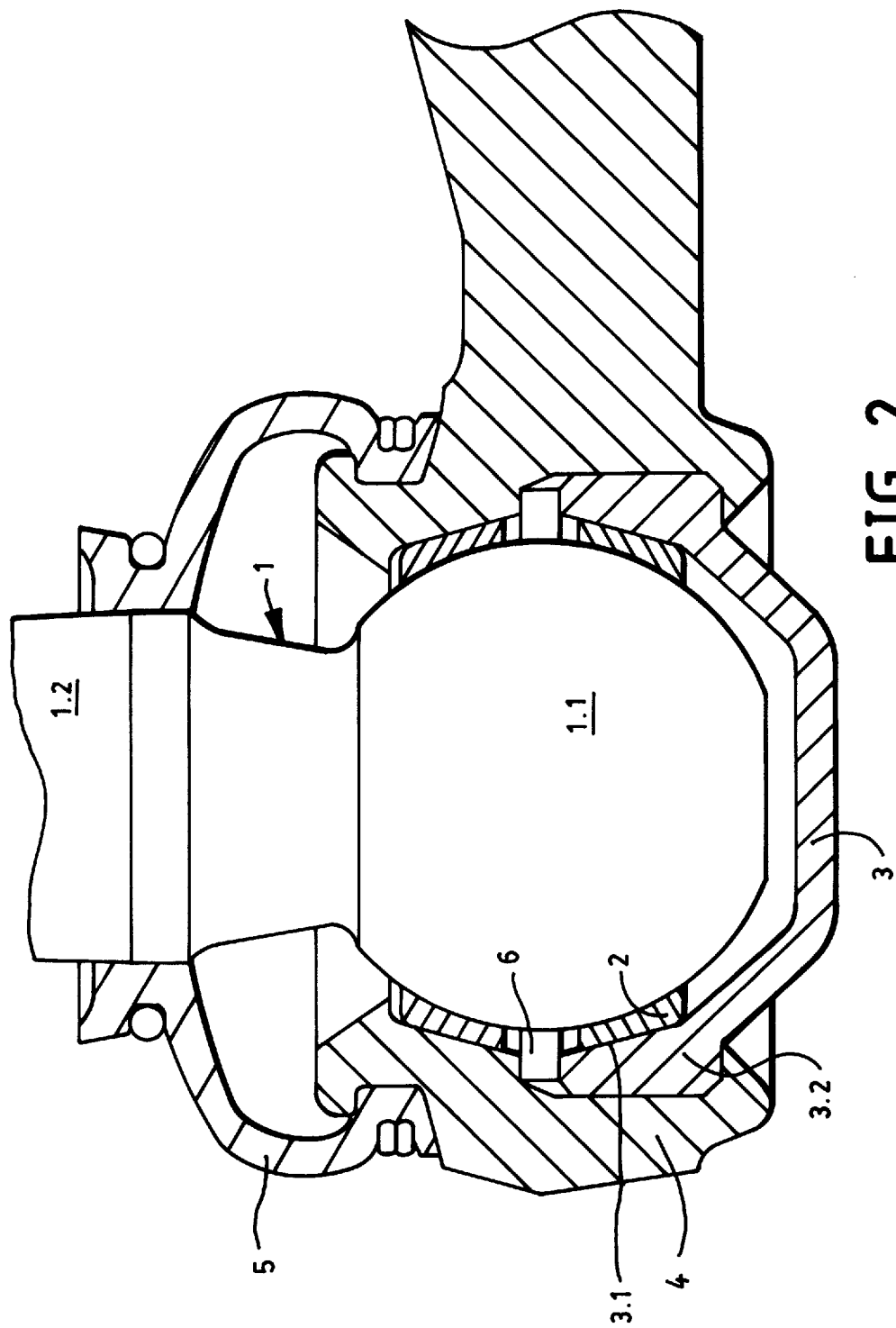
FIG. 2 is a ball joint according to the present invention with a bearing shell having a conical outer circumference.

FIG. 2 shows another ball joint according to the present invention. The difference from the joint shown in FIG. 1 is in the conical shape of the outer contour of the bearing shell 2. The bearing shell 2 is a two-part bearing shell in this embodiment of a ball joint according to the present invention as well. One part of the bearing shell lies directly in the housing 4 in the ball joint shown, while the other part is accommodated by the insert ring 3 and is pressed against the joint ball 1.1 of the ball pivot 1 during the tightening process. Due to the insert ring 3 being screwed in, the ball pivot 1 is displaced in the axial direction, and it is thus pressed increasingly more strongly against the part of the bearing shell 2 inserted into the housing 4. A housing 4 that is open on both sides may be used in the ball joint shown in FIG. 2. The insert ring 3 closes off the housing on one side. A sealing bellows 5 is attached for sealing on the opposite side.

A low-friction ball joint according to the present invention is prepared by fitting the ball pivot 1 with its joint ball 1.1 made integrally in one piece with it into the insert ring 3 via the intermediary of the bearing shell 2 and subsequently screwing the said insert ring with its external thread into the internal thread of the housing 4 in a self-locking manner. The two part bearing shell is uniformly pressed against the joint ball 1.1 of the ball pivot 1 during the screwing-in process due to the sliding contact between the insert ring 3 and the bearing shell 2. The pressing increases with increasing depth of screwing in of the insert ring, so that the mobility of the ball pivot noticeably decreases as the insert ring penetrates into the housing more deeply.

The coefficients of friction occurring between the bearing shell 2 and the joint ball 1.1 are continuously determined during the screwing in. One possibility for this measurement is to measure the torque that must be applied to deflect the ball pivot 1. The desired coefficient of friction can thus always be set highly accurately regardless of the manufacturing tolerances of the components of the ball joint. The desired setting is preserved due to the self-locking of the thread. The insert ring 3 is then tightened by beading the edge of the housing in the housing 4 over some areas. A radially outwardly directed, circular collar 3.2 is provided for this purpose. It should be borne in mind in this connection that this collar shall not come into contact with the housing in the axial direction, but a free space 6 shall be left here. This is necessary to avoid stresses of material in the insert ring 3, which could lead to a distortion of the coefficients of friction once set.

While specific embodiments of the invention have been shown and described in detail to illustrate the application of the principles of the invention, it will be understood that the invention may be embodied otherwise without departing from such principles.

List of Reference Numbers:
1 Ball pivot
1.1 Joint ball
1.2 Pivot
2 Bearing shell
3 Insert ring
3.1 Jacket surface
3.2 Collar
3.3 Collar
4 Housing
5 Sealing bellows
6 Free space

What is claimed is:

1. A low-friction ball joint, comprising:

a housing with internal threading;

a joint ball;

a ball pivot formed integrally in one piece with said joint ball;

an insert ring with external threading;

a two part bearing shell, said joint ball being inserted into the two part bearing shell and said joint ball and said two part bearing shell being inserted into the insert ring, said insert ring with its external threading being screwed into the internal threading of the housing and tightened such that one part of said bearing shell is pressed uniformly and adjustably by the insert ring against the joint ball of the ball pivot and another part of said bearing shell is pressed uniformly and adjustably by the housing against the joint ball of the ball pivot, said internal threading and external threading providing a self locking connection for fixing a frictional value between said bearing shell and said joint ball.

2. A low-friction ball joint, formed by the steps comprising:

providing a housing with internal thread;

forming a ball pivot integrally in one piece with a joint ball;

providing an insert ring with external thread;

providing a two part bearing shell;

inserting the joint ball into the two part bearing shell;

fitting the joint ball and the two part bearing shell into the insert ring;

subsequently screwing the insert ring with its external thread into the internal thread of the housing;

additionally tightening the insert ring in the housing such that one part of said bearing shell is pressed uniformly and adjustable by the insert ring against the joint ball of the ball pivot and another part of said bearing shell is pressed uniformly and adjustable by the housing against the joint ball of the ball pivot; and providing said internal thread and external thread as a self locking connection.

3. The low-friction ball joint in accordance with claim 2, wherein the self-locking connection of the thread comprises one of:

providing a connection incorporated in the material;

providing a self-cutting thread;

providing a conical thread; and providing thread with an offset thread.

4. The low-friction ball joint in accordance with claim 2, wherein the insert ring has an internally cylindrical jacket area which accommodates the bearing shell, the bearing shell being cylindrical on the outside at least in some areas, the insert ring centripetally pretensioning the bearing shell in relation to the joint ball of the ball pivot.

5. The low-friction ball joint in accordance with claim 2, wherein the insert ring has an internally conical jacket area which accommodates the bearing shell, the bearing shell being conical on the outside at least in some areas, the insert ring centripetally pretensioning the bearing shell in relation to the joint ball of the ball pivot.

6. The low-friction ball joint in accordance with claim 2, further comprising:

during said step of additionally tightening the insert ring in the housing determining friction between said bearing shell and said joint ball; and setting a friction value between said bearing shell and said joint ball with said self locking connection.

7. The low-friction ball joint in accordance with claim 2, wherein the insert ring has a collar, which is circular in the radial direction, the collar tightening the insert ring in the housing.

8. The low-friction ball joint in accordance with claim 2, wherein the insert ring has a support for a sealing bellows.

9. A process for preparing a low-friction ball joint, comprising:

providing a housing with an internal thread;

forming a ball pivot integrally in one piece with a joint ball;

providing an insert ring with an external thread;

providing a two part bearing shell;

inserting the joint ball into the two part bearing shell;

fitting the joint ball and the two part bearing shell into the insert ring;

subsequently screwing the insert ring with its external thread into the internal thread of the housing; and additionally tightening the insert ring in the housing such that one part of said bearing shell is pressed uniformly and adjustably by the insert ring against the joint ball of the ball pivot and another part of said bearing shell is pressed uniformly and adjustably by the housing against the joint ball of the ball pivot.

10. The process in accordance with claim 9, wherein said internal thread and external thread are self locking, the self-locking of the thread comprising a connection incorporated in the material.

11. The process in accordance with claim 9, wherein said internal thread and external thread are self locking, the self-locking of the thread comprising providing a self-cutting thread.

12. The process in accordance with claim 9, wherein said internal thread and external thread are self locking, the self-locking of the thread comprising a conical thread.

13. The process in accordance with claim 9, wherein said internal thread and external thread are self locking, wherein the self-locking of the thread comprising an offset thread.

14. The process in accordance with claim 9, wherein the insert ring has an internally cylindrical jacket area which accommodates the bearing shell, the bearing shell being cylindrical on the outside at least in some areas, the insert ring centripetally pretensioning the bearing shell in relation to the joint ball of the ball pivot.

15. The process in accordance with claim 9, wherein the insert ring has an internally conical jacket area which accommodates the bearing shell, the bearing shell being conical on the outside at least in some areas, the insert ring centripetally pretensioning the bearing shell in relation to the joint ball of the ball pivot.

16. The process in accordance with claim 9, further comprising the steps of:

providing said internal thread and external thread as a self locking connection;

during said step of additionally tightening the insert ring in the housing determining the frictional force between said bearing shell and said joint ball; and setting a frictional force value between said bearing shell and said joint ball with said self locking connection.

17. The process in accordance with claim 9, wherein the insert ring has a collar, which is circular in the radial direction, the collar tightening the insert ring in the housing.

18. The process in accordance with claim 9, wherein the insert ring has a support for a sealing bellows.

* * * * *